June 27, 1939.  H. M. ULLSTRAND ET AL  2,164,045
REFRIGERATION
Filed Dec. 7, 1935    7 Sheets-Sheet 1

INVENTORS
Hugo M. Ullstrand
Albert R. Thomas
BY
ATTORNEY.

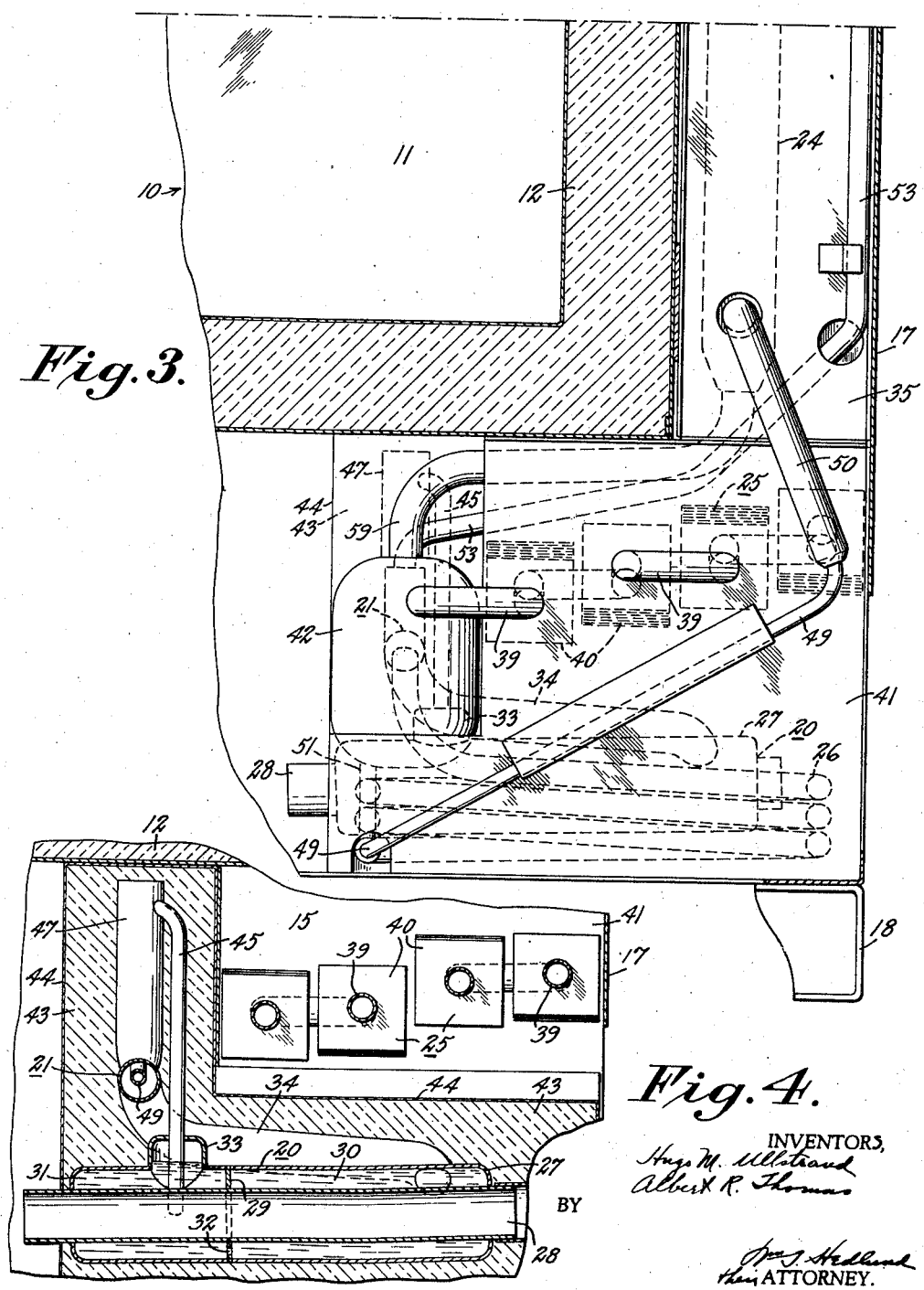

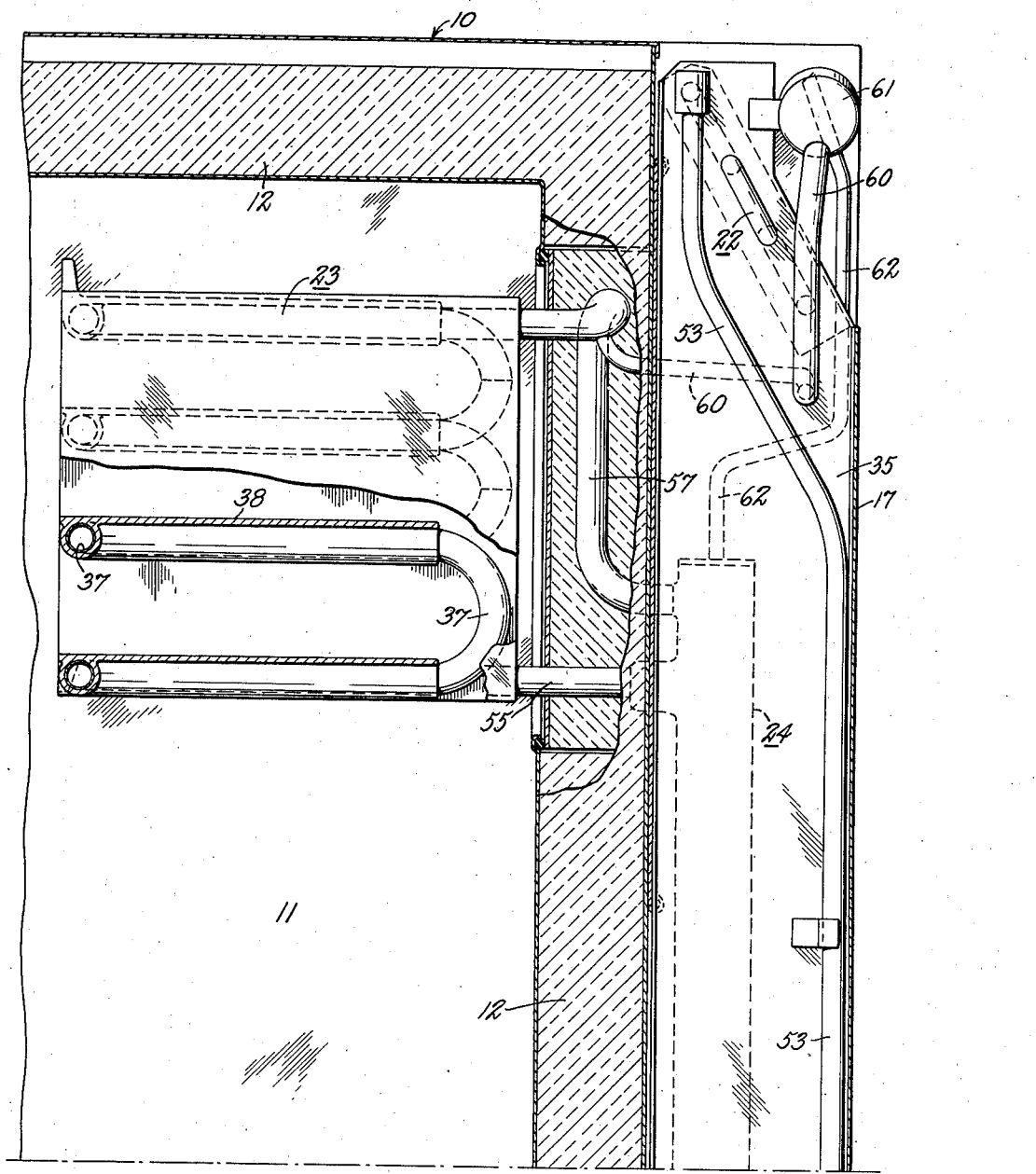

June 27, 1939.  H. M. ULLSTRAND ET AL  2,164,045
REFRIGERATION
Filed Dec. 7, 1935  7 Sheets-Sheet 4

INVENTORS,
Hugo M. Ullstrand
Albert R. Thomas
BY
their ATTORNEY.

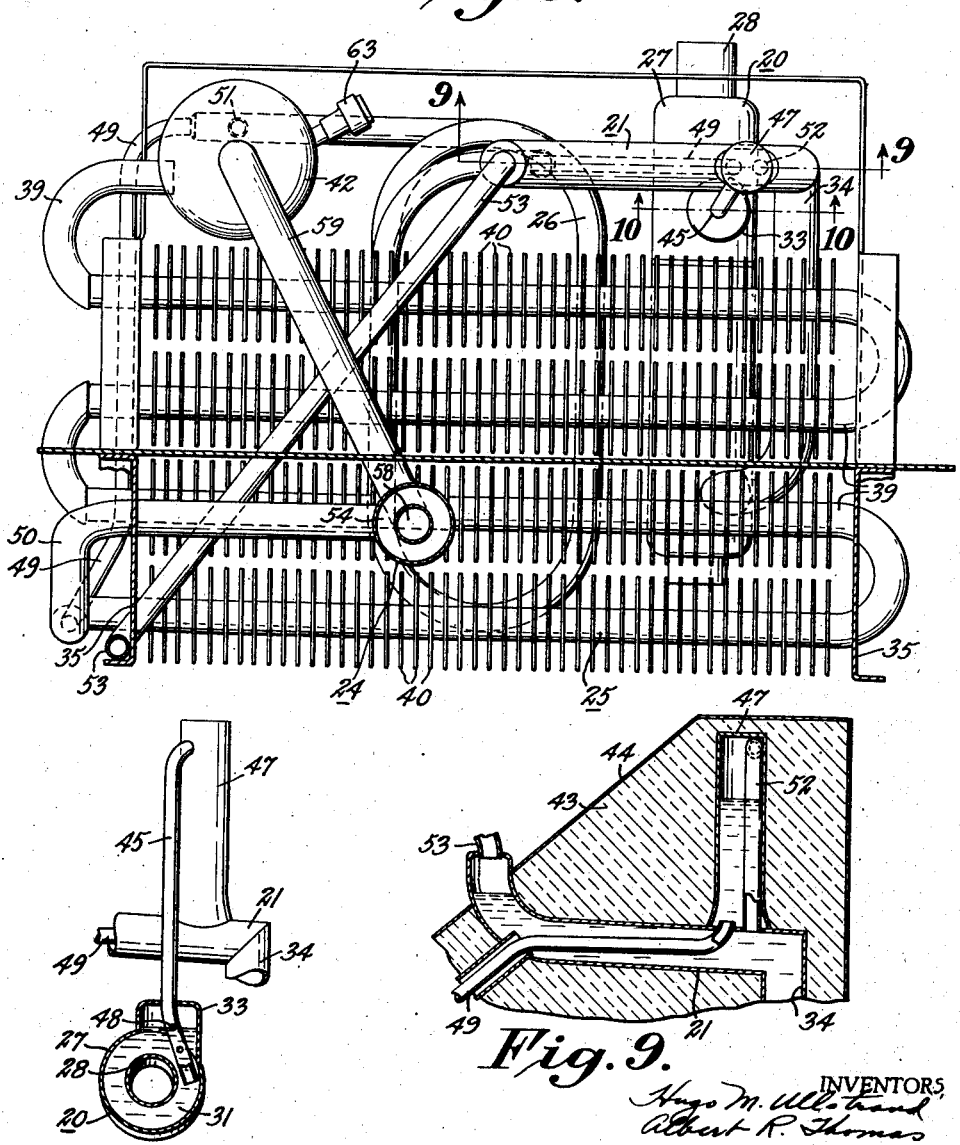

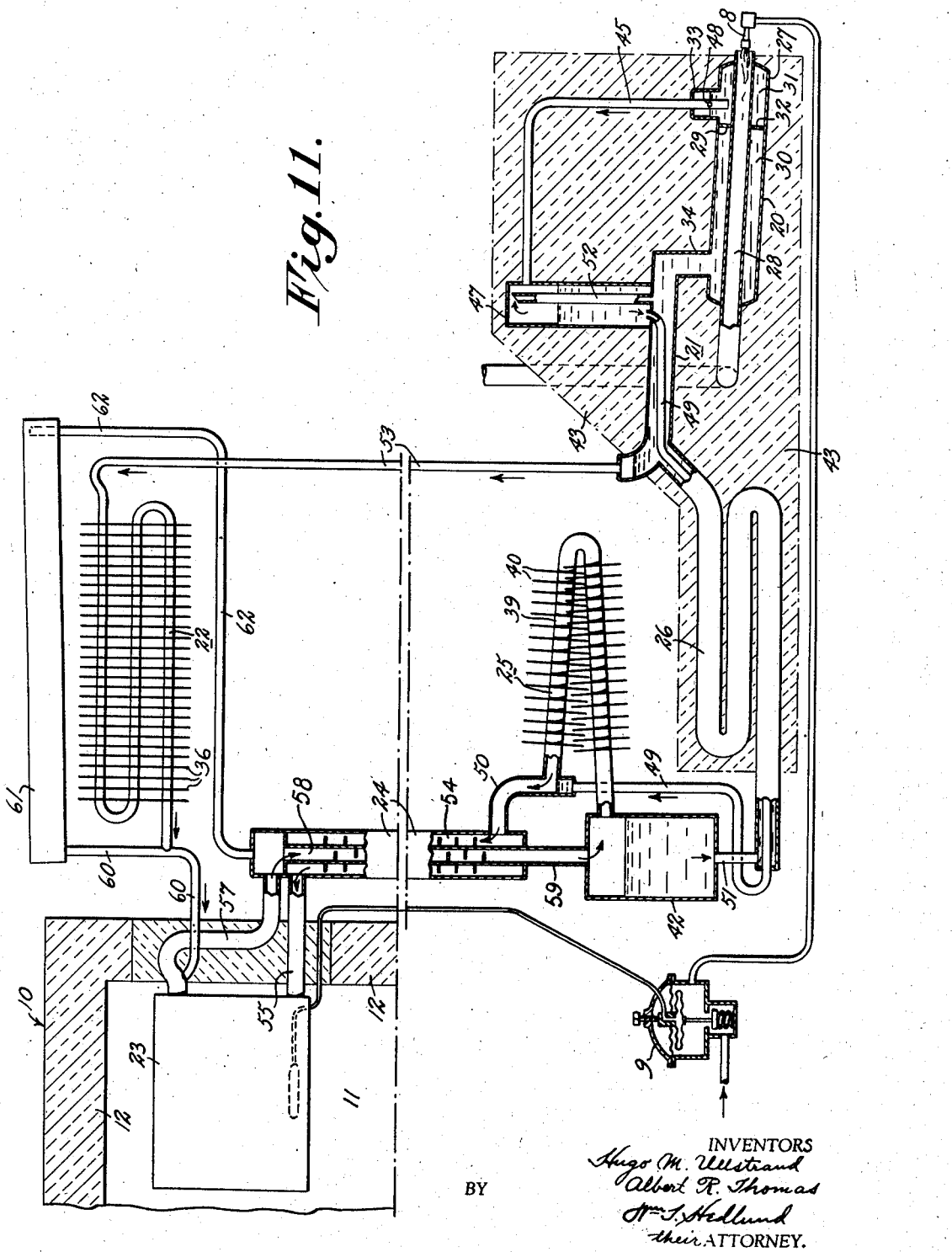

Patented June 27, 1939

2,164,045

UNITED STATES PATENT OFFICE 2,164,045

REFRIGERATION

Hugo M. Ullstrand and Albert R. Thomas, Evansville, Ind., assignors to Servel, Inc., New York, N. Y., a corporation of Delaware Application December 7, 1935, Serial No. 53,376

12 Claims. (Cl. 62—119.5)

This invention relates to absorption type refrigerators and it is an object of the invention to provide an improved absorption type refrigerator which is accomplished by new arrangements for circulation of fluids in an absorption refrigerating system, and new structure and relation of parts for cooling thereof.

The improved arrangement for circulation of fluids includes the provision of a horizontal submersion analyzer in which vapor can be kept in contact with absorption solution for a relatively long time without an appreciable head of liquid on the vapor. The vapor is caused to flow in a generally horizontal direction through the absorption solution beneath the liquid level thereof, that is, the vapor flows through the solution by liquid displacement. The invention also includes the improvement of associating the submersion analyzer with the relatively long column of absorption solution from which vapor is expelled out of solution. This is desirable in that in effect the column of absorption solution forms an extension of the analyzer, whereby all of the vapor flows through a body of solution having a steep gradient in refrigerant concentration.

The invention is also concerned with improved air cooling of an absorber in a system of the kind using an inert gas. In order to remove as much refrigerant from gas as possible, absorption liquid preferably flows counter-current to the gas whereby weak absorption liquid, which has the greatest affinity for refrigerant, contacts the gas just before it leaves the absorber. If gas enriched with refrigerant flows parallel with absorption liquid and enriched gas first meets weak absorption liquid, the weak liquid takes up a large quantity of refrigerant from the gas mixture and is subsequently incapable of absorbing refrigerant from the gas mixture when the solution comes in contact with weaker gas further along in the absorber. The gas outlet end of an absorber in a system of this type is of primary consideration in efficiency and it should be cooled as much as possible to utilize the absorption liquid most effectively to absorb refrigerant from the gas mixture.

When the absorption liquid temperature is lowered at the gas outlet end of the absorber it will hold more refrigerant and the lower will be the refrigerant vapor pressure in the gas leaving the absorber. The overall efficiency is improved even though the temperatures of the gas rich in refrigerant and absorption solution rich in refrigerant are increased at the gas inlet end of the absorber. This is due to the fact that rich gas entering the absorber at the gas inlet end contains so much refrigerant in it that absorption can take place even though the temperature and concentration of the absorption solution have been raised relative to conditions at the gas outlet end.

In accordance with this invention a direct air-cooled absorber has been provided in which the absorber conditions mentioned above have been advantageously employed. In order to induce circulation of air by natural draft the absorber is located in the lower part of the refrigerator cabinet and is preferably arranged in a generally horizontal plane at the lower end of a flue. With this arrangement a relatively high column of warm air is produced to induce circulation of air in the flue by natural draft. To reduce the depth of the refrigerator cabinet a portion of the generally horizontal absorber is located beneath the thermally insulated storage space and in a wider lower portion of the flue of which a part is directly beneath a narrower upper portion extending to the top of the cabinet. Thus the necessity of providing a flue having the same cross-sectional area throughout its height is avoided and the overall depth of the refrigerator cabinet is made as small as possible. The velocity of the cooling air in the wider lower portion of the flue is greatest in the part which is directly beneath the upper narrower portion. The generally horizontal absorber is so arranged and connected in the refrigerating system that the gas inlet end will be in the offset part of the wider lower portion of the flue and the gas outlet end will be located in the part or region of the lower wider portion directly beneath the narrower upper portion. With this arrangement the cooling air flows past the gas outlet end of the absorber at a higher velocity than the gas inlet end, whereby the gas leaving the absorber will be deprived of as much refrigerant as possible.

The above and other objects and advantages of the invention will be better understood upon reference to the following description and accompanying drawings forming a part of this specification, and of which:

Fig. 3 is a fragmentary sectional view of the lower portion of the refrigerator shown in Figs. 1 and 2;

Fig. 4 is a fragmentary sectional view on line 4—4 of Fig. 6;

Fig. 5 is a sectional view showing the part of the refrigerator above that illustrated in Fig. 3;

Fig. 8 is a sectional view taken on line 8—8 of Fig. 6;

Fig. 9 is a fragmentary sectional view on line 9—9 of Fig. 8;

Fig. 10 is a fragmentary sectional view on line 10—10 of Fig. 8; and

Fig. 11 is a more or less diagrammatic illustration of the internal communications of the refrigeration apparatus shown in the preceding figures.

Figure 1:
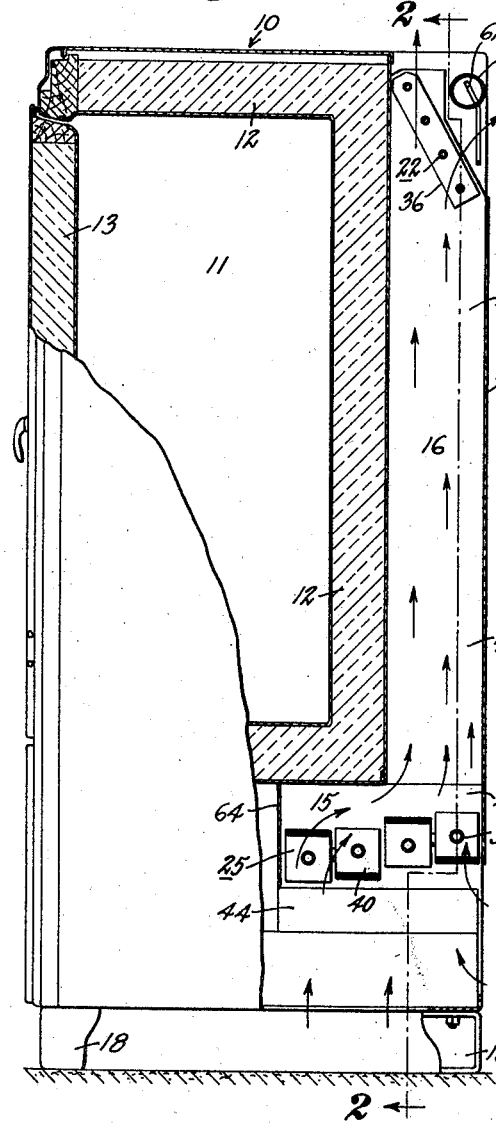
Fig. 1 is a side view, partly in cross-section on line 1—1 of Fig. 2, of a refrigerator embodying the invention.
Figure 2:
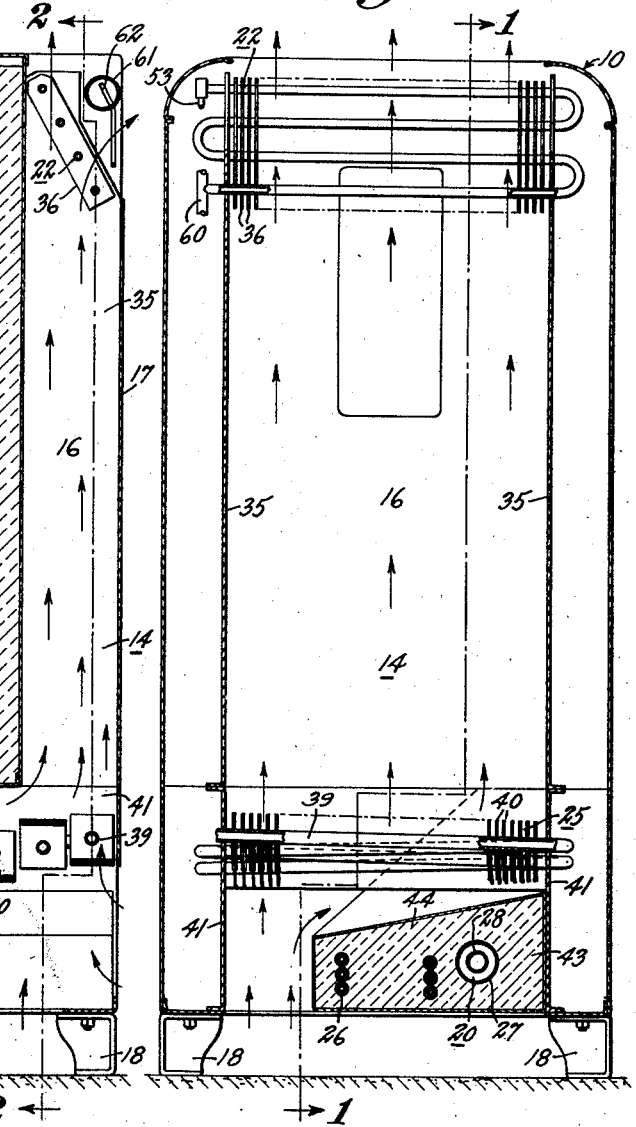
Fig. 2 is a sectional view of the refrigerator taken on line 2—2 of Fig. 1.

Referring more particularly to Figs. 1 and 2, a refrigerator cabinet, generally indicated by the reference numeral 10, provides a food storage compartment 11 having thermally insulated walls 12 and accessible by means of a thermally insulated door 13. The cabinet 10 also has an apparatus compartment generally indicated by the reference numeral 14 and consisting of a portion 15 in the lower part of the cabinet below the food storage compartment 11 and a narrow portion 16 extending upwardly from the lower portion 15 and in the rear of the insulated storage compartment 11. The apparatus compartment 14 is open at the bottom and also at the top. A removable rear plate 17 which forms the back wall of the cabinet and also a wall of the apparatus compartment 14 does not extend all the way to the top of the cabinet nor all the way to the bottom of the cabinet. The cabinet 10 is supported by legs 18 providing a space between the open bottom of the apparatus compartment 14 and the floor for free flow of air into the apparatus compartment.

Referring now to all the figures in general and more particularly to those figures specifically indicated for attention as the description proceeds, there is provided in the refrigerator cabinet 10 a refrigeration apparatus comprising an absorption refrigeration system of a uniform pressure type including a generator 20, an analyzer 21, a condenser 22, an evaporator 23, a gas heat exchanger 24, an absorber 25, and a liquid heat exchanger 26. These parts will now be individually described.

The generator 20 may be seen in Figs. 2, 3, 4, 6, 10 and 11, and particular reference may be had to Figs. 4 and 11. The generator 20 comprises a substantially horizontal cylindrical vessel 27 through which extends a flue 28. The horizontal vessel 27 is divided by a partition 29 into what may be termed a generating chamber 30 and a circulation chamber 31. These chambers are in communication by means of an aperture 32 in the lower part of the partition 29. The circulation chamber 31 is provided with a dome 33. The generator is heated by any suitable means such as, for instance, a gas burner 8 arranged so that the burner flame is projected into the end of the heating flue 28 adjacent the circulation chamber 31.

The analyzer 21 may be seen in Figs. 3, 4, 6, 8, 9, 10 and 11, and particular reference may be had to Figs. 9 and 11. The analyzer 21 comprises a substantially horizontal cylindrical tube turned upwardly at the left hand end as seen in Fig. 9. The other end of the analyzer 21 is connected by means of a conduit 34 to the generating chamber 30 of the generator 20, as illustrated in Figs. 4 and 11.

The condenser 22 may be seen in Figs. 1, 2, 5, 7 and 11. Referring particularly to Figs. 1 and 2, the condenser 22 comprises what may be termed a relatively flat pipe coil; that is, a plurality of straight lengths of tube arranged in parallel in the same plane and connected at their ends by U-turns to form a single series conduit. The ends of the condenser turns extend through and are supported by the upper ends of two plates 35 arranged vertically in the narrow upright portion 16 of the apparatus compartment 14. Intermediate the side plates 35 the condenser is provided with heat transfer fins 36. The condenser is arranged at an angle and extends across substantially the whole width of the upper ends of the side plates 35.

The evaporator 23, located in the storage compartment 11, may be seen in Fig. 5 and comprises a pipe coil 37 adapted for upward flow of gas and continuously downward flow of liquid therethrough and arranged in thermal conductive relation, as by casting, with a suitable receptacle 38 arranged to receive ice freezing trays or the like.

The gas heat exchanger 24 may be seen in Figs. 3, 5, 6, 7, 8 and 11 and comprises a substantially upright cylindrical vessel having separated passages for two streams of gas therethrough in counter-flow heat exchange relation. For a more detailed description of the gas heat exchanger 24, reference may be had to Patent No. 1,880,533.

The absorber 25 may be seen in Figs. 1, 2, 3, 4, 6, 8 and 11. With particular reference to Figs. 1 and 2, the absorber comprises what may be termed a relatively flat pipe coil 39 disposed in a generally horizontal plane and provided with heat transfer fins 40. Although the condenser 22 and the absorber 25 have both been referred to as generally flat pipe coils, the absorber coil is slightly different in structure. Like the condenser, the absorber comprises a plurality of straight tubes or branches arranged in parallel in substantially the same plane, but alternate tubes or branches are oppositely inclined at a slight angle and each of the tubes is provided with substantially perpendicular heat transfer fins. The tubes are connected by end turns to form a single series conduit adapted for upward flow of gas and continuously downward flow of liquid therethrough. The alternate groups of fins, due to the tubes being oppositely inclined, are also oppositely disposed at a slight angle to the perpendicular of the general horizontal plane of the absorber coil. This fin arrangement results in turbulence in air flowing upwardly, as hereinafter described, resulting in greater heat transfer from the fins to the air. The ends of the absorber coil extend through and are supported by side plates 41, as shown in Fig. 2, which are spaced apart a distance equal to the spacing of the previously described upper side plates 35. The upper ends of the side plates 41 and the lower ends of the side plates 35 are connected together, respectively. The side plates 41 are wider than the side plates 35 and extend into the lower portion 15 of the apparatus compartment 14. The absorber coil 39 is thus located in a generally horizontal plane in the lower portion 15 of the apparatus compartment 14 and also beneath the narrow portion 16, and adjacent the lower end of the space between the side plates 35 and 41. As may be seen in Figs. 3, 6, and 8, the lower or gas inlet end of the coil 39 of the absorber 2 is connected to what will be herein termed an absorber accumulation vessel 42.

The liquid heat exchanger 26 may be seen in Figs. 2, 3, 6, 8 and 11. With more particular reference to Figs. 2 and 6, the liquid heat exchanger 26 comprises a pair of concentric tubes formed into a coil and providing separate paths of flow for liquid in counter-current heat exchange relation. The liquid heat exchanger 26 is located alongside of the generator 20. To prevent loss of heat by radiation, the generator 20, the analyzer 21, and the liquid heat exchanger 26 are encased by thermal insulation material 43 such as, for instance, mineral wool held in place by a light sheet metal casing 44.

The generator 20 and the absorber 25 are interconnected for circulation of liquid therebetween by way of the liquid heat exchanger 26. Referring more particularly to Fig. 11, the circulation chamber 31 of the generator 20 is connected by means of what may be termed a thermosyphon conduit 45 to the upper end of a circulation vessel 47 which is located immediately above the analyzer 21. The lower end of the thermosyphon conduit 45 extends into the dome 33 of the generator and downwardly into the circulation chamber 31. The thermosyphon conduit 45 has an internal diameter sufficiently small so that gas and liquid cannot readily pass each other therein; and the lower end of the conduit 45, within the circulation chamber 31 of the generator, is provided with one or more holes 48 as described in Patent No. 1,645,706 to Alvar Lenning. The lower part of the circulation vessel 47 is connected by means of a conduit 49 to the lower end of a conduit 50. A portion of the conduit 49 comprises the inner tube of the concentric tube liquid heat exchanger 26. The upper end of the coil 39 of the absorber 25 is also connected to the conduit 50. The lower end of the absorber accumulation vessel 42 is connected by means of a conduit 51 to the lower end of the outer tube of the concentric tube liquid heat exchanger 26. The upper end of this outer tube is connected to one end of the analyzer 21. The other end of the analyzer 21 is connected by means of a conduit 34 to the generating chamber 30 of the generator 20, as previously set forth. The several connections just described form a circuit for liquid between the generator and absorber and in which liquid circulates as hereinafter described.

The generator 20 is connected for flow of vapor therefrom to the condenser 22. Referring more particularly to Fig. 11, the generator is connected to the analyzer 21 by conduit 34 as previously described. The upper end of the circulation vessel 47 is also connected to the analyzer 21 by a conduit 52. The upturned end of the generally horizontal analyzer 21 is connected by a conduit 53 to the upper end of the condenser coil 22.

The evaporator 23 and the absorber 25 are connected for circulation of gas therebetween by way of the gas heat exchanger 24. Referring more particularly to Fig. 11, the upper end of the coil 39 of the absorber 25 is connected to the conduit 50 as previously described. The upper end of the conduit 50 is connected to the lower end of the outer passage of the gas heat exchanger 24. The upper end of the outer passage is connected by a conduit 55 to the lower end of the coil of the evaporator 23. The upper end of the evaporator coil is connected by a conduit 57 to the upper end of the inner passage of the gas heat exchanger 24. The lower end of the inner passage 58 is connected by a conduit 59 to the upper part of the absorber accumulation vessel 42. The several connections just described form a circuit for circulation of gas between the absorber and evaporator which takes place in a manner hereinafter described.

The lower end of the condenser coil 22 is connected to a conduit 60. The lower end of the conduit 60 is connected to the upper end of the evaporator 23, as shown in Fig. 11. Between the lower end of the condenser and the upper end of the evaporator, the conduit 60 forms a slight downward loop which constitutes a liquid trap seal to prevent flow of uncondensed gas from the condenser to the evaporator.

Figure 7:
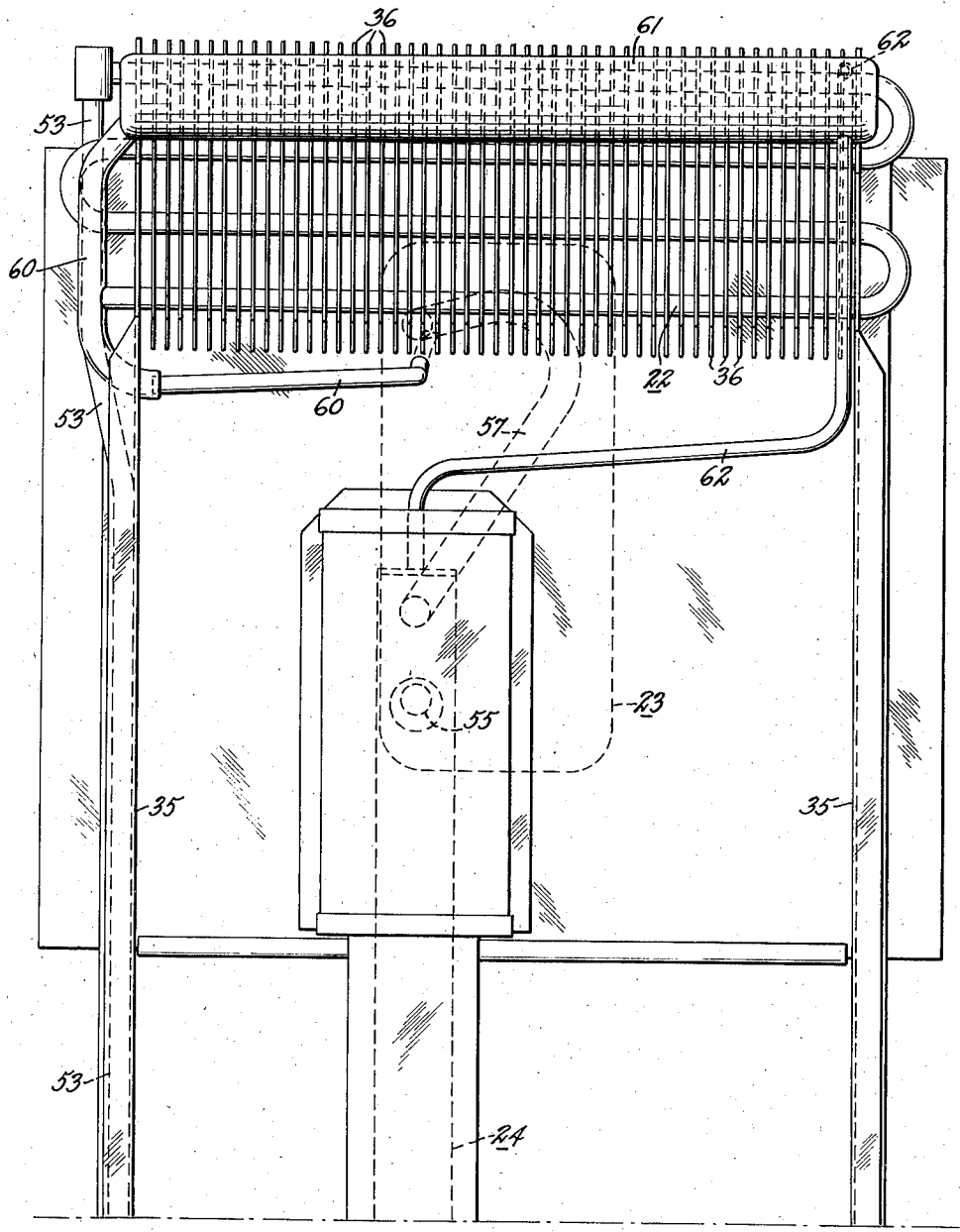
Fig. 7 is a rear view of that portion of the refrigeration apparatus shown in Fig. 5, and taken together with Fig. 6 constitutes a rear view of the whole refrigeration apparatus.

Above the condenser 22 in the upper end of the refrigerator apparatus compartment 14, in the angular space formed there by the slanted condenser, there is located a generally horizontal cylindrical vessel 61 which may be referred to as a pressure vessel. This is shown in Figs. 5 and 7. The pressure vessel 61 is tilted slightly toward the left, as seen in Fig. 7, so that liquid therein will drain toward the lower end thereof. The upper end of the previously described conduit 60, which connects the condenser 22 to the upper end of the evaporator 23, is connected to the lower end of the pressure vessel 61. The other end of the pressure vessel 61 is connected from a point adjacent the upper part thereof to the inner passage 58 of the gas heat exchanger 24 by means of a conduit 62.

Figure 6:
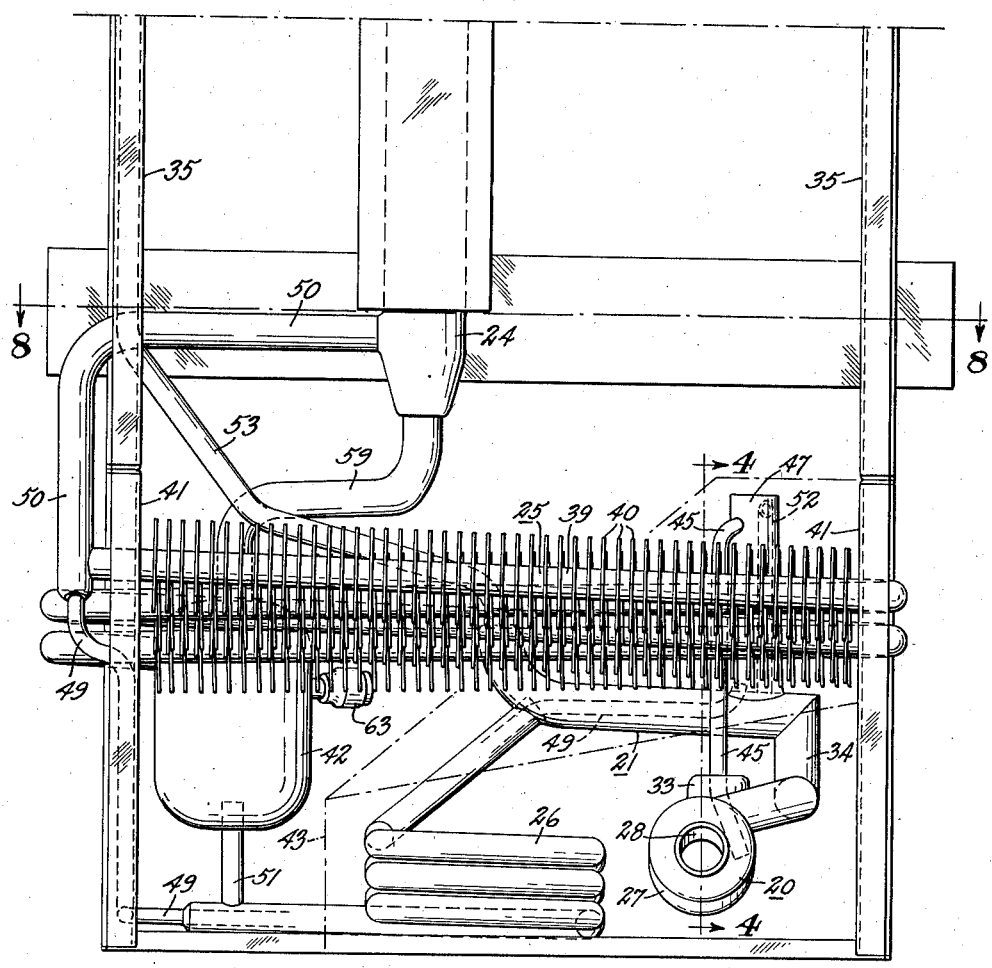
Fig. 6 is a rear view of that portion of the refrigeration apparatus shown in Fig. 3.

As may be seen in Figs. 6 and 8, the absorber accumulation vessel 42 is provided with a member 63 which may be referred to as a charging plug. By means of this plug 63, the system is exhausted and there is introduced into the system, which has now been completely described in detail, a solution of refrigerant fluid in an absorption liquid as, for instance, a thirty per cent solution of ammonia in distilled water. The quantity of liquid that is thus placed in the system is such that during operation of the system, as hereinafter described, liquid will be at a level in the absorber accumulation vessel 42 below the connection thereto of the lower end of the absorber coil 39 and substantially at the same level in the upturned end of the analyzer 21 so that the horizontal portion of the analyzer is flooded with liquid, as illustrated in Fig. 11. There is then introduced into the system through the charging plug 63 an inert gas as, for instance, hydrogen. The hydrogen is introduced into the system at a pressure such that the total pressure in the system will be sufficient for complete condensation of ammonia in the condenser at high room temperatures.

Fig. 11 illustrates more or less diagrammatically the system of the above described apparatus as far as the internal communications of the several parts are concerned. As shown in this diagram, the generator 20 may be heated by a gas burner 8 which is arranged so that the flame produced thereby is projected into the heating flue 28. The burner 8 is regulated by a thermostat 9 responsive to temperature of the evaporator 23, whereby the system operates to maintain a substantially constant evaporator temperature.

Operation of the system is as follows:

Ammonia vapor is expelled from solution by heat in the generator chamber 30. The expelled vapor passes upwardly through conduit 34 to the analyzer 21 and thence upwardly through conduit 53 to the condenser 22. In conduit 34 and the analyzer 21, the ammonia vapor bubbles through enriched absorption liquid flowing toward the generator chamber. Water vapor condenses out of the ammonia vapor, the heat of condensation here creating what may be referred to as an internally heated zone. In this internally heated zone some ammonia vapor is expelled from the enriched solution and this vapor joins the vapor from the generator flowing toward the condenser.

Ammonia vapor is condensed to liquid in the condenser 22, the heat of condensation being dissipated to air by way of the heat transfer fins 36 on the condenser 22. Liquid ammonia flows from the lower end of the condenser coil 22 into the conduit 60 and thence into the upper end of the coil 37 of the evaporator 23.

The liquid ammonia flows downwardly in the evaporator 23, evaporating and diffusing into hydrogen which enters the lower end of the evaporator coil through conduit 55. The resulting rich gas mixture of ammonia and hydrogen leaves the upper end of the evaporator coil and flows though conduit 57, the inner passage 58 of the gas heat exchanger 24, and conduit 59 to the absorber accumulation vessel 42. This rich gas mixture from the absorber accumulation vessel 42 enters the lower end of absorber coil 39, that is, the end thereof located in portion 15 of the apparatus compartment 14, and flows upwardly in contact with and in counter-flow to weakened absorption liquid, whereby ammonia vapor is absorbed out of the gas mixture into solution. The gas which is weak in ammonia leaves the upper end of the absorber coil 39 which is located directly beneath the narrow portion 16 of the apparatus compartment 14. The weak gas flows through conduit 58, the outer passage 54 of the gas heat exchanger 24, and conduit 55 to the lower end of the coil 37 of the evaporator 23, thus completing the cycle of gas circulation between the evaporator 23 and absorber 25 by way of the gas heat exchanger 24.

Absorption liquid flows from the generator chamber 30, which may be referred to as a first externally heated zone, through the orifice 32 into the circulation chamber 31 which is also heated and may be referred to as a second externally heated zone. Ammonia vapor is expelled from solution in the circulation chamber 31 and accumulates in the dome 33 until the level of liquid therein is depressed to the hole 48 in the lower end of the thermosyphon conduit 45, whereupon bubbles of gas enter the conduit 45 and cause upward flow of liquid in this conduit into the upper part of the circulation vessel 47. The vapor which issues from the upper end of the thermosyphon conduit 45 flows from the upper part of the circulation vessel 47 through conduit 52 into the analyzer 21 where the vapor bubbles through the enriched absorption liquid flowing toward the generator to form an internally heated zone, whereby the vapor is analyzed in the manner previously explained. This vapor also flows to the condenser through conduit 53. Weakened absorption liquid flows by gravity from the circulation vessel 47 through conduit 49 of the liquid heat exchanger 26 into conduit 50, and thence into the upper end of the absorber coil 39 where it first contacts weak gas leaving the absorber and flows downwardly in contact with and counter-current to the gas mixture, as previously mentioned. The resulting enriched solution accumulates in the absorber accumulation vessel 42 below the connection thereto of the lower end of the absorber coil 39. From the absorber accumulation vessel 42, enriched absorption liquid flows through conduit 51 and the outer passage of the liquid heat exchanger 26 into the analyzer 21 and thence through conduit 34 to the generator chamber 30, thus completing the cycle of circulation of absorption liquid between the generator 20 and the absorber 25 by way of liquid heat exchanger 26.

Any non-condensable gas, such as hydrogen, which may find its way into the condenser coil 22, flows from the lower end of the condenser coil into conduit 60 and thence upwardly into the pressure vessel 61. From the pressure vessel, this gas may return to the gas circuit by way of the conduit 62 which is connected from the upper part of the pressure vessel 61 to the inner passage of the gas heat exchanger 24. If the temperature of the cooling air rises so high that the total pressure in the system is not sufficient for condensation of ammonia at the increased temperature in the condenser 22, uncondensed ammonia vapor flows from the lower end of the condenser 22 into the conduit 60 and thence into the pressure vessel 61, displacing hydrogen from the latter through conduit 62 into the gas circuit. During operation under these conditions, the pressure vessel 61 functions as a continuation of the condenser and ammonia vapor is condensed to liquid in the pressure vessel. This liquid flows from the pressure vessel through conduit 60 into the upper end of the evaporator 23 together with liquid ammonia from the condenser.

The absorber 25 and the condenser 22 are both externally cooled zones or heat dissipating elements. Both are cooled by flow of air in contact therewith and for this purpose are provided with extensive heat transfer surfaces formed by fins. As previously explained, the absorber 25 is arranged in a generally horizontal plane and located between side plates 41 in the lower part of the apparatus compartment 14. The condenser 22 is placed across the upper end of the apparatus compartment 14 between the upper side plates 35. It will now be understood that when the refrigeration apparatus unit is assembled with the cabinet, the space between the side plates 35, 41, the rear plate 17, and the rear wall of the storage compartment 11 forms an upright flue with the absorber 25 at the very bottom of the flue, and the condenser tube across the top end of the flue. A plate 64 is connected between the lower side plates 41 at the forward end of the absorber 25, as may be seen in Fig. 1. The plate 64 prevents entrance of unheated air into the flue space above the absorber 25 which would result in dampening of the flue draft. The flow of air is indicated in Figs. 1 and 2 by arrows. The air flows upwardly over the finned absorber coil and into the flue space. An upward draft is thus created on account of the difference in weight of the heated column of air in the flue space above the absorber and an equivalent column of atmospheric air. The condenser 22 is located at the upper end of the flue and directly in this draft of air. There is no opening into the flue space between the absorber and the condenser so that no unheated air can enter the flue and dampen or check the flue draft. A greater heat transfer from the absorber fins 40 to the air is obtained by creating turbulence which is accomplished by the previously described absorber structure in which alternate groups of the fins 40 are inclined at a slight angle to the general direction of air flow through the absorber. Since the upper end of the absorber coil 39, where the weakened solution enters and the weak gas leaves through conduit 50, tends to operate at a higher temperature than the remainder of the absorber, this end is positioned in line with the narrower upper part 16 of the flue so as to be in the path of the greatest flow of air; that is, the air velocity is higher at the upper weak gas end of absorber coil 39 than at the lower rich gas end of the coil, whereby greater cooling is effected at the upper weak gas end so that the inert gas leaving the absorber will be deprived of as much refrigerant as possible.

Various changes may be made within the scope of the invention which is not limited except as set forth in the following claims.

What is claimed is:

1. In an absorption refrigeration system, an absorber, a first heating zone, a second heating zone, members for circulation of absorption liquid from said absorber through said heating zones in series respectively, said members and said second heating zone cooperating to cause said circulation by vapor lift action, and means to conduct vapor from said second heating zone and bubble said vapor through absorption liquid below the level of said absorption liquid in its path of flow from said absorber to said first heating zone and below the level of liquid in said absorber.

2. In an absorption refrigeration system, a first externally heated zone, a second externally heated zone, an externally cooled zone, members for circulation of solution from said cooled zone through said externally heated zones in series respectively, said members and said second externally heated zone cooperating to cause said circulation of solution, and means for conducting vapor from said second externally heated zone through the circulating solution beneath the liquid level thereof to produce an internally heated zone, and means for conducting vapor from last said zone through a condensation-evaporation cycle to said externally cooled zone.

3. In an absorption refrigeration system, a first externally heated zone, a second externally heated zone, an externally cooled zone, members for circulation of solution from said cooled zone through said externally heated zones in series respectively, said members and said second externally heated zone cooperating to cause said circulation of solution, and means for conducting vapor from both of said externally heated zones through the circulating solution beneath the liquid level thereof to produce an internally heated zone, and means for conducting vapor from last said zone through a condensation-evaporation cycle to said externally cooled zone.

4. An absorption refrigeration system comprising a generator, an absorber, members including a thermosyphon for circulation of absorption liquid between said generator and absorber, an evaporator, members for circulation of auxiliary inert gas between said evaporator and absorber, a condenser connected to receive vapor from said generator and to deliver condensate to said evaporator, said absorber including a finned tube adapted for upward flow of gas and downward flow of liquid therethrough and a vessel having the lower end of said tube connected thereto, said system including a conduit for conducting vapor from said generator and said thermosyphon to said condenser, said absorber being so located and connected in said system that enriched absorption liquid stands in said absorber vessel at a level below the connection thereto of the absorber tube, and also floods a part of said conduit so that vapor flowing to said condenser must bubble through the liquid.

5. In an absorption refrigeration system, an evaporator, an absorber, conduits connecting said evaporator and absorber for circulation of auxiliary inert gas therebetween, a condenser, a pressure vessel communicating with said auxiliary gas circuit and connected to receive uncondensed gaseous fluid which has passed through said condenser, conduits for separately withdrawing liquid from said condenser and pressure vessel and conducting the withdrawn liquid to said evaporator, a first heating zone, a second heating zone, members for circulation of absorption liquid from said absorber through said heating zones in series respectively, means for bubbling vapor from both of said heating zones through the circulating absorption liquid and then conducting the vapor to said condenser, said absorber and condenser both being adapted for air cooling, and an upright flue in which said absorber is located at the bottom and said condenser is located at the top, the flue having imperforate walls between the absorber and condenser.

6. In a refrigerating system of the kind in which a solution containing a refrigerant flows from a place of absorption to a place of heating and refrigerant vapor is expelled out of solution due to said heating and flows to a place of condensation, the improvement which consists in flowing said refrigerant vapor by liquid displacement through a flowing body of said solution and in a generally horizontal direction countercurrent to the flow thereof before flowing to the place of condensation.

7. In a refrigeration system in which a solution of refrigerant fluid flows to a place of heating and vaporous refrigerant fluid is expelled out of solution in said place of heating, the improvement which consists in flowing expelled refrigerant vapor in a generally horizontal direction in contact with solution flowing to said place of heating and below the surface level of the flowing solution.

8. In an absorption refrigeration system, an absorber including a plurality of tubular branches disposed substantially side by side and laterally of each other and having a generally downward slope for gravity flow of absorption liquid, one branch having an average elevation higher than another branch, means to cause flow of inert gas and refrigerant vapor from a lower branch to a higher branch, and means whereby cooling air flows in contact with said branches and at a higher velocity past the branch of higher elevation than the branch of lower elevation.

9. Refrigeration apparatus comprising structure forming a passageway in which air is adapted to flow and a vessel in such passageway provided with a relatively large heat transfer surface, conduit means for introducing absorption liquid and an inert gas including vaporous refrigerant into said vessel, and said structure and said conduit means being constructed and arranged to provide lateral flow of gas in said vessel and from a first part or section past which cooling air flows to a second part or section past which cooling air flows at a higher velocity.

10. An absorption type refrigerator having walls defining an upright flue, said flue having a narrower upper portion and a wider lower portion, and refrigeration apparatus including a generally flat absorber for absorbing refrigerant from a gas, means for introducing absorption liquid and withdrawing gas at one end of said absorber and for withdrawing absorption liquid and introducing gas at an opposite end of said absorber, said absorber being located in a generally horizontal plane in the wider lower portion of said flue for cooling by natural air draft with the part or section thereof at said one end directly beneath the narrower upper portion of said flue and the part or section thereof at said opposite end so situated that gas flows in said absorber from one region in said flue to another region where the velocity of air past said absorber is higher, so as to maintain the absorption liquid at as low a temperature as possible at the part or section of said absorber at said one end and thereby deprive the withdrawn gas of as much refrigerant as possible.

11. A refrigerator as set forth in claim 10 in which said absorber is a generally flat pipe coil provided with heat transfer fins.

12. A refrigerator having walls defining an upright air flue having an upper narrow portion and a lower wide portion, an absorption refrigeration system including an absorber connected for flow of inert gas therethrough containing refrigerant fluid, said absorber having heat transfer surface for cooling by air flowing upward in said flue, and said absorber being disposed in the lower wide portion of said flue with the part or section from which inert gas leaves directly below the upper narrow portion of said flue and the part or section into which inert gas enters so situated that gas flows in said absorber from one region in said flue to another region where the velocity of air past the absorber is higher, whereby inert gas leaving said absorber is deprived of as much refrigerant as possible.

HUGO M. ULLSTRAND.
ALBERT R. THOMAS.